United States Patent
Young et al.

(10) Patent No.: US 8,938,801 B2
(45) Date of Patent: Jan. 20, 2015

(54) MANAGING DOMAIN NAME ABUSE

(75) Inventors: Michael William Young, Toronto (CA);
Stephen Van Egmond, Toronto (CA);
Greg Aaron, Philadelphia, PA (US)

(73) Assignee: Architelos, Leesburg, VA (US)

( * ) Notice: Subject to any disclaimer, the term of this patent is extended or adjusted under 35 U.S.C. 154(b) by 0 days.

(21) Appl. No.: 13/416,688

(22) Filed: Mar. 9, 2012

(65) Prior Publication Data

US 2013/0239209 A1    Sep. 12, 2013

(51) Int. Cl.
| G06F 11/00 | (2006.01) |
| G06F 12/14 | (2006.01) |
| G06F 12/16 | (2006.01) |
| G08B 23/00 | (2006.01) |
| H04L 29/12 | (2006.01) |

(52) U.S. Cl.
CPC ........ H04L 61/2076 (2013.01); H04L 61/3025 (2013.01); *Y10S 707/99934* (2013.01)
USPC ...... 726/22; 726/6; 713/2; 709/203; 709/205; 707/999.004

(58) Field of Classification Search
CPC .................. H04L 61/2076; H04L 61/3025
USPC .......................................................... 726/22
See application file for complete search history.

(56) References Cited

U.S. PATENT DOCUMENTS

| 2006/0080437 | A1  |  4/2006 | Lake |
| 2007/0214503 | A1* |  9/2007 | Shulman et al. ................ 726/22 |
| 2008/0177994 | A1* |  7/2008 | Mayer .............................. 713/2 |
| 2009/0031033 | A1  |  1/2009 | Deng et al. |
| 2009/0164582 | A1* |  6/2009 | Dasgupta et al. ............ 709/205 |
| 2011/0247061 | A1* | 10/2011 | Loveland et al. ................ 726/6 |
| 2011/0289583 | A1* | 11/2011 | Shulman et al. ................ 726/22 |

FOREIGN PATENT DOCUMENTS

WO       2007106826 A2     9/2007

OTHER PUBLICATIONS

European Search Report from the European Patent Office from corresponding EP13158369.2 dated Jun. 11, 2013 (5 Pages).

* cited by examiner

*Primary Examiner* — Arvin Eskandarnia
(74) *Attorney, Agent, or Firm* — Ohlandt, Greeley, Ruggerio & Perle, L.L.P.

(57) ABSTRACT

A method for providing an abuse sentry service for responding to domain name abuse is described. The method comprises the following steps. A plurality of disparate abuse feeds is received, each comprising data relating to a subset of potential domain name abuse. Filters are applied to the data to create a custom abuse feed. Data from the custom abuse feed is grouped based on priority levels. For each of the groups, one or more corresponding workflows are executed as a response to the potential domain name abuse. A computer readable medium including instructions for implementing the method is also described.

8 Claims, 2 Drawing Sheets

US 8,938,801 B2

MANAGING DOMAIN NAME ABUSE

The present invention relates generally to managing domain name abuse and specifically to a system and method for automatically responding to allegations of abuse based on information from a plurality of disparate resources.

BACKGROUND

Domain names are subject to various forms of abuse. These include publically defined forms such as spam, phishing, and malware as well as policy defined forms of abuse such as trademark, copyright and restricted use behaviour. Policies defining abuse come both from the Internet Corporation for Assigned Names and Numbers (ICANN), which is a regulatory body for the Internet, and a domain name registry operator, which is an entity responsible for domain names registered in a top-level domain TLD. Further, registrars, which are entities accredited to sell domain names, and registrants, who are the holders of the domain names, can also have specific policies defining abuse.

The domain registry operator is responsible for all elements of a given Top Level Domain (TLD) including who may register a domain name and what defines permitted use of the domain name. There are two basic types of TLD operator: a generic TLD (gTLD) and a country code TLD (ccTLD). The gTLD operator falls fully under ICANN's overreaching policies and a ccTLD operator operates TLDs on behalf of a given country authority. CcTLD operators are beholden to their country's policies and controls.

Domain name abuse affects TLD operators, registrars (those who resell domains) and registrants (those who hold domains), as well as countless Internet users that may have interacted with a domain name under abuse. Abuse is mitigated, by some parties, through a series of disparate tools, sources of data, custom analytics and mostly manual review and mediation by analysts. Most parties will respond to external requests to domain name abuse detected by others. The problem with this approach is that typically the greatest damage caused by domain name abuse happens within hours of its onset. Reactive mitigation, while helpful, does not alleviate the vast majority of damage caused by domain abuse.

Accordingly, a number of abuse service providers collect data about domain name abuse and provide data feeds accordingly. These abuse service providers typically offer their services through an application program interface (API), reporting mechanism, or both. They are also specialized to one or a few forms of abuse and may or may not be independently confirmed or verified, leading to a disparity in the quality and accuracy of their abuse reporting. Accordingly, it can be an expensive and complex procedure for a TLD operator, registrar or registrant to receive and process such information.

Accordingly, there is a need for a mechanism that allows TLD operators to efficiently and automatically detect and react to domain name abuse.

SUMMARY OF THE INVENTION

The present invention provide a mechanism to pro-actively combat domain abuse that can be used by one or more of TLD operators, registrars and their delegated resellers, and ultimately registrants. The net benefit is to all parties, including Internet end-users, by reducing costs and harms associated with domain name abuse, such as fraud, theft, false products, false medication, and the like.

In accordance with an aspect of the present invention there is provided a method for providing an abuse sentry service for responding to domain name abuse, comprising the steps of: receiving, at a computer, a plurality of disparate abuse feeds, each abuse feed comprising data relating to particular subset of potential domain name abuse; applying one or more filters to the data to create a custom abuse feed; grouping the filtered data from the custom abuse feed into groups of data based on priority levels; and for each of the groups of data, executing one or more corresponding workflows as a response to the potential domain name abuse.

In accordance with a further aspect of the present invention there is provided a computer readable medium having stored thereon instructions for execution by a computing device, which when executed cause the computing device to implement the steps of receiving a plurality of disparate abuse feeds, each abuse feed comprising data relating to particular subset of potential domain name abuse; applying one or more filters to the data to create a custom abuse feed; grouping the filtered data from the custom abuse feed into groups of data based on priority levels; and for each of the groups of data, executing one or more corresponding workflows as a response to the potential domain name abuse.

BRIEF DESCRIPTION OF THE DRAWINGS

Embodiments of the present invention will now be described by way of example only with reference to the following drawings in which.

DETAILED DESCRIPTION OF THE PREFERRED EMBODIMENTS

Figure 1:
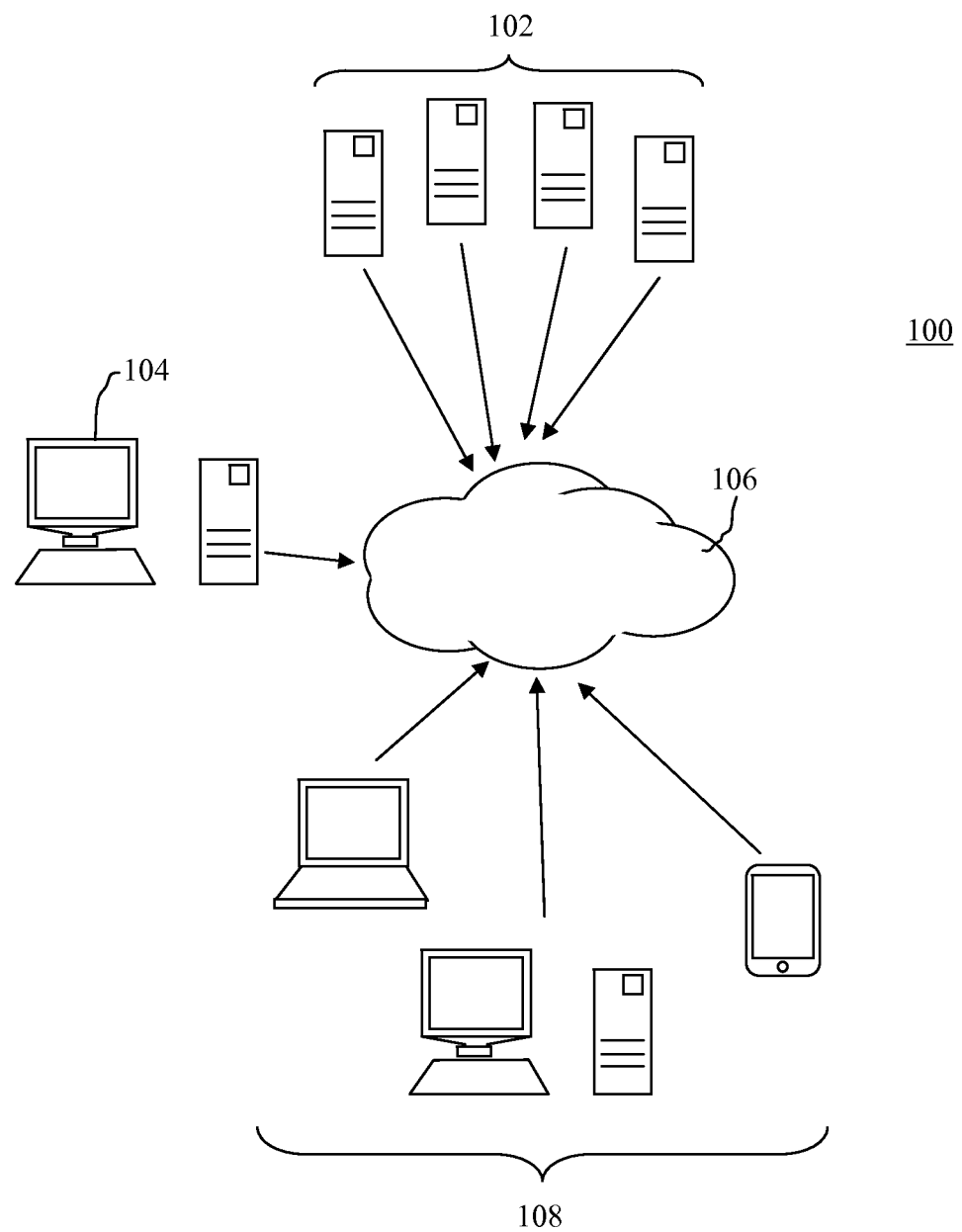
FIG. 1 is a block diagram illustrating a system for detecting and reacting to domain name abuse.

For convenience, like numerals in the description refer to like structures in the drawings. Referring to FIG. 1, a system for automatically detecting and reacting to domain name abuse is illustrated generally by numeral 100. The system comprises a plurality of abuse service providers 102, an abuse sentry service 104, a communication network 106, and a plurality of clients 108.

The abuse service providers 102 include a number service providers that provide abuse feeds for domain names. The particular service providers selected to be the abuse service providers 102 depend on the implementation and may change over time as new service providers are introduced. The abuse sentry service 104 is a program executed on a computer that is configured to receive the data feeds from all of the abuse service providers 102. In the present embodiment, the computer is separate from the clients, but that need not be true. The abuse sentry service 104 is further configured to filter and react to information in the data feeds, as will be described. The communication network 106 is a wide-area communication network such as the Internet. Other means for establishing the communication network 106 can be used without detracting from the invention as claimed. The clients 108 may include one or more of TLD registry operators, registrars, registrar agents, or domain name owners. The clients 108 may include other entities that wish to track domain name abuse, without detracting from the invention as claimed.

In general terms, the abuse sentry service 104 aggregates abuse data feeds offered by the abuse service providers 102. It then allows each of the clients 108 to not only select one or more of the abuse data feeds, but also a selective portion of one or more of the abuse data feeds. The client 108 may, for instance, select a small portion of three abuse data feeds and a complete fourth abuse data feed. This allows the client to build a custom abuse data feed comprised of potentially many originating sources.

Once the client 108 has established their custom abuse data feed, the client can define a number of different abuse priority levels based on a predefined criteria. The abuse data received in custom abuse feed is automatically grouped or sorted based on its abuse priority level.

Further, the client 108 can define a number of custom workflows. Each workflow comprises a predefines series of actions or event. Each workflow can be assigned to one or more of the abuse priority levels. Further, each abuse priority level can have a plurality of assigned workflows.

Figure 2:
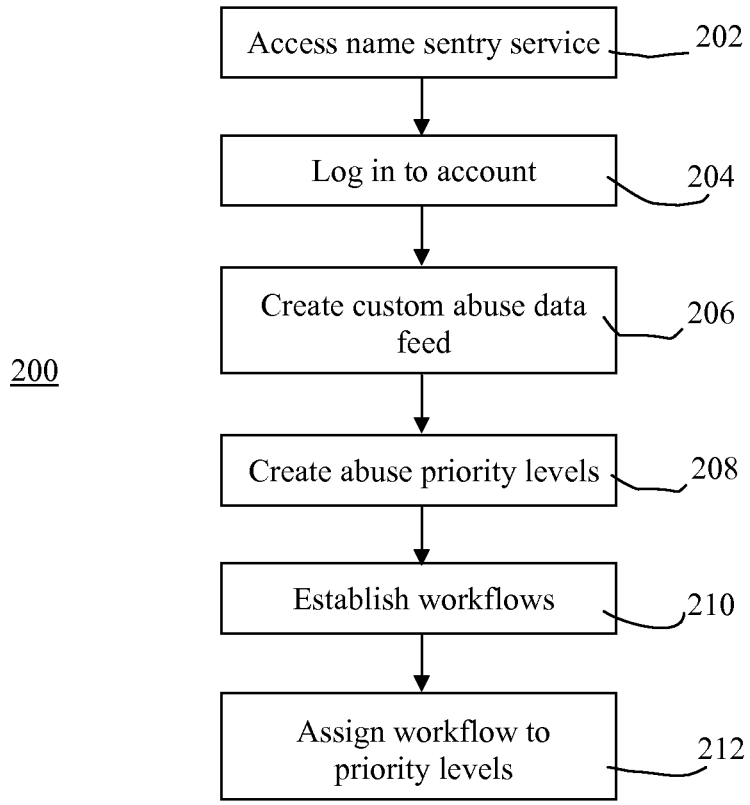
FIG. 2 is a flow chart illustrating steps taken by a client to set up an abuse sentry service to monitor and react to domain name abuse.

Referring to FIG. 2, a flow chart illustrating steps taken by the client 108 to set up the name sentry service 104 to monitor potential domain name abuse on its behalf is illustrated generally by numeral 200. At step 202, the client 108 accesses the name sentry service 104 using a computing device connected to the communication network 106. The computing device may be any one of a number of network connected devices including, for example, personal computers (including desktops, notebooks and netbooks), tablets, smart phones and the like. The client 108 can use either a web browser or a dedicated application installed on the computing device to access the name sentry service 104.

At step 204, the client 108 logs in to the client's account using a user name and password. As is standard in the art, the user name and password may be stored on the computing device and accessible by the web browser or dedicated application to automatically log in to the client's account at the name sentry service 104. As is standard in the art, the client's account can be initially set up either offline or online.

At step 206, the client 108 creates their custom abuse data feed. In the present embodiment, the client 108 is presented with a list of available abuse data feeds. Optionally, detailed information about the abuse data feeds is also provided. Such information may include, for example, the type of abuse(s) monitored by the corresponding abuse service provider 102, the domains monitored, and the like. The client 108 is further presented with a list of predefined abuse data feed filters and an option to create a custom abuse data feed filter.

Thus for example, an abuse service provider 102 may report spam for TLDs .ca, .uk, .com, au, and .eu. Predefined filters for this type of abuse data feed may include filters for each of the available TLDs. As another example, an abuse service provider 102 may report multiple types of abuse for a given TLD. Predefined filters for this type of abuse data feed may include filters for each of the available types of abuse. Accordingly, the predefined filters can vary between implementation and will depend on the nature of the abuse data feeds received from the abuse service providers 102.

Examples of custom filters for this type of abuse data feed may include one or more second-level of the TLDs as well as abuse policies specific to the client.

At step 208, the client 108 creates their abuse priority levels. In the present embodiment, for each abuse priority level, the client 108 is presented with a list of criteria. The criteria is based, at least in part, on the data available in the custom abuse data feed. Thus, for example, if the custom abuse data feed includes data relating to phishing, spam, and trademark abuse, each of these types of abuse is available as one of the criteria. Some clients 108 may consider spam a simple nuisance and assign a low abuse priority level. Other clients 108 may wish to take spam abuse incidents seriously and assign a high priority level.

Further, the reliability or credibility of each of the abuse service providers 102 can be used as one of the criteria. The reliability of the abuse service providers 102 can be provided by the abuse servers 102 themselves, a trusted third party, the name sentry service 104, or a combination thereof.

At step 210, the client establishes a plurality of workflows. In order to define the workflows, the client 108 is presented with a list of predefined workflows and an option to create custom workflows. Examples of predefined workflows include alerting the client via an e-mail message, creating a report and the like. Examples of custom workflows include opening a ticket in a third party ticketing system, using data to update industry ranking, alert a user, and the like.

The workflows are highly configurable and may vary greatly between different ones of the clients 108. For example, a TLD operator could do anything, from nothing to notifying an assigned Registrar, to notifying a Registrant directly, to taking the domain name out of active use directly. A Registrar may do anything, from nothing to taking the domain out of active use, to suspending all additional domains associated with that Registrant after investigation. A Registrant may find that their domain has been compromised or flagged erroneously as a spam source and seek to correct these problems.

At step 212, the client 108 assigns one or more of the plurality of workflows to corresponding ones of the abuse priority levels. The name sentry service 104, checks the assigned workflow to ensure that there are no conflicts in the workflows. At this point, the name sentry service 104 is ready to act upon perceived domain name abuses as they occur, or shortly thereafter, thereby reducing potential harm to the client 108.

Figure 3:
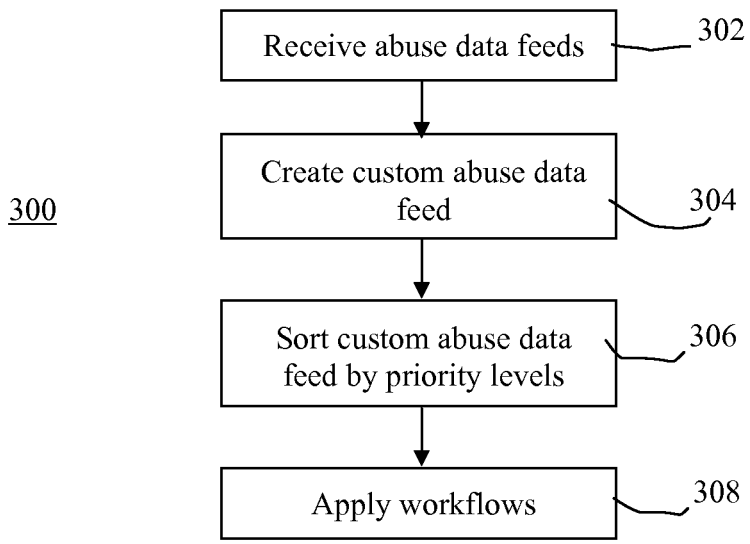
FIG. 3 is a flow chart illustrating steps taking by the abuse sentry service to to monitor and react to domain name abuse.

Referring to FIG. 3, a flow chart illustrating steps taken by the name sentry service 104 to implement the policies established by the clients 108 is illustrated generally by numeral 300. At step 302, the name sentry service 104 receives the plurality abuse data feeds from a plurality of disparate abuse service providers 102.

At step 304, for each of the clients 108, the data from the plurality of abuse data feeds is filtered, based on the defined abuse data feed filters, to created the custom abuse data feed. At step 306, each custom abuse data feed is sorted based on the corresponding created abuse priority levels. Data having the same abuse priority level is grouped together. At step 308, for each group of data, one or more established workflows is executed to respond to the potential domain name abuse.

Thus, the abuse sentry service 104 provides a mechanism to aggregate a number of disparate abuse data feeds and allow the clients 108 to subscribe to custom portion of the abuse data feeds that is relevant to a particular business case. Further, the abuse sentry service 104 provides a mechanism to create and allocate abuse priority levels to these detected forms of abuse, based on individual policy considerations and mitigation practices. Once the abuse priority level for the data has been assigned, predefined actions are automatically taken on behalf of the client 108, based on the workflow(s) assigned to that abuse priority level. This will provide the client 108 with automated, proactive steps that can reduce costs and harms associated with domain name abuse.

Yet further, the abuse sentry service 104 provides the ability for the client 108 to effectively subscribe to a fraction of the abuse data feed provided by the abuse data service 102. Accordingly, it may be possible to reduce subscriber fees thereby reducing the cost of monitoring domain name abuse.

Using the foregoing specification, the invention may be implemented as a machine, process or article of manufacture by using standard programming and/or engineering techniques to produce programming software, firmware, hardware or any combination thereof.

Any resulting programs, having computer-readable program code, may be embodied within one or more computer-usable media such as memory devices or transmitting devices, thereby making a computer program product or article of manufacture according to the invention. As such, the terms "software" and "application" as used herein are intended to encompass a computer program existent (permanently, temporarily, or transitorily) on any computer-usable medium such as on any memory device or in any transmitting device.

Examples of memory devices include, hard disk drives, diskettes, optical disks, magnetic tape, semiconductor memories such as FLASH, RAM, ROM, PROMS, and the like. Examples of networks include, but are not limited to, the Internet, intranets, telephone/modem-based network communication, hard-wired/cabled communication network, cellular communication, radio wave communication, satellite communication, and other stationary or mobile network systems/communication links.

A machine embodying the invention may involve one or more processing systems including, for example, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

Using the description provided herein, those skilled in the art will be readily able to combine software created as described with appropriate general purpose or special purpose computer hardware to create a computer system and/or computer subcomponents embodying the invention, and to create a computer system and/or computer subcomponents for carrying out the method of the invention.

What is claimed is:

1. A method for providing an abuse sentry service for responding to domain name abuse, comprising the steps of:
   receiving, at a computer, a plurality of disparate abuse feeds from a plurality of service providers, each of the plurality of service providers configured to collect information regarding a subset of potential domain name abuse, each of the plurality of disparate abuse feeds comprising data identifying domain names associated with the subset of potential domain name abuse;
   applying one or more filters to the data to create a custom abuse feed, the custom abuse feed comprising a selective portion of one of more of the plurality of disparate abuse feeds;
   grouping the filtered data from the custom abuse feed into groups of data based on predefined priority levels of the filtered data; and
   for each of the groups of data, executing one or more corresponding workflows as a response to the potential domain name abuse.

2. The method of claim 1, wherein the filters are predefined, customized or a combination thereof.

3. The method of claim 1, wherein each of the plurality of disparate abuse feeds has an associated reliability level.

4. The method of claim 3, wherein the reliability level is assigned by an abuse service generating the abuse feed, a trusted third party, the abuse sentry service or any combination thereof.

5. A non-transitory computer readable medium having stored thereon instructions for execution by a computing device, which when executed cause the computing device to implement the steps of:
   receiving a plurality of disparate abuse feeds from a plurality of service providers, each of the plurality of service providers configured to collect information regarding a subset of potential domain name abuse, each of the plurality of disparate abuse feeds comprising data identifying domain names associated with a the subset of potential domain name abuse;
   applying one or more filters to the data to create a custom abuse feed comprising a selective portion of one of more of the plurality of disparate abuse feeds;
   grouping the filtered data from the custom abuse feed into groups of data based on predefined priority levels of the filtered data; and
   for each of the groups of data, executing one or more corresponding workflows as a response to the potential domain name abuse.

6. The non-transitory computer readable medium of claim 5, wherein the filters are predefined, customized or a combination thereof.

7. The non-transitory computer readable medium of claim 5, wherein each of the plurality of disparate abuse feeds has an associated reliability level.

8. The non-transitory computer readable medium of claim 7, wherein the reliability level is assigned by an abuse service generating the abuse feed, a trusted third party, the abuse sentry service or any combination thereof.

* * * * *